Figure 1:
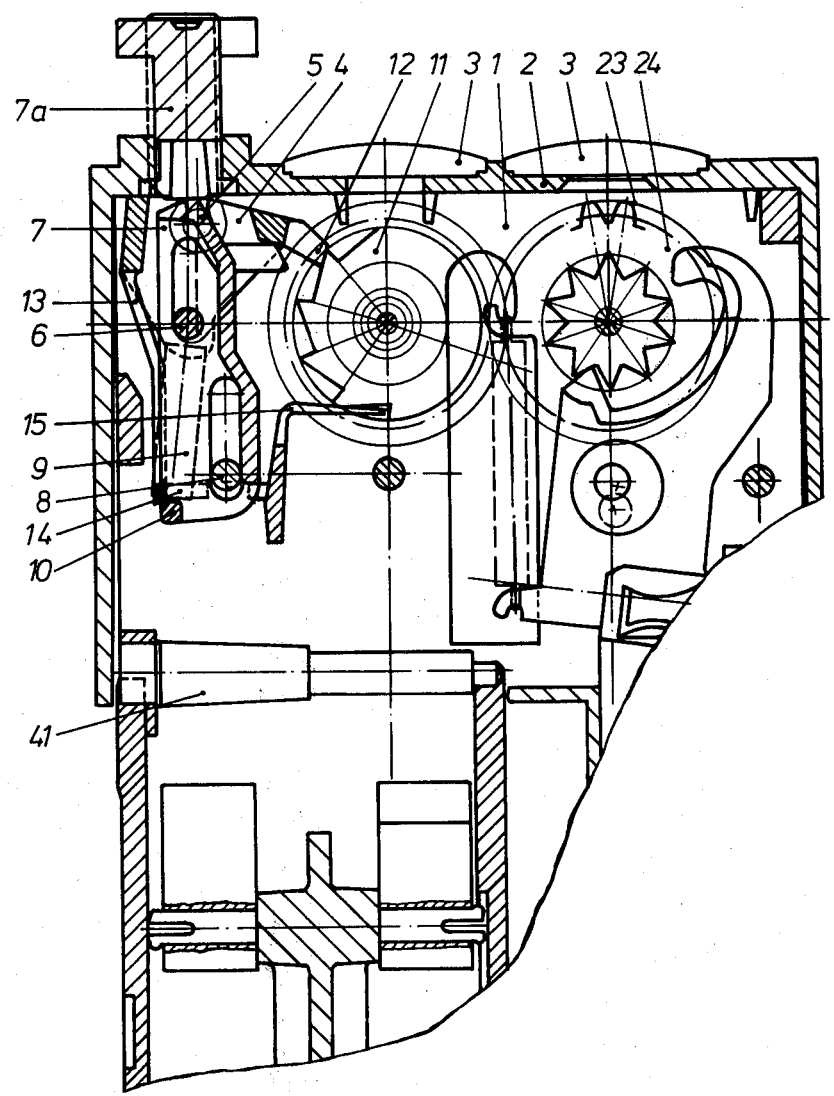

United States Patent [19]

Neher

[11] 4,277,677

[45] Jul. 7, 1981

[54] MECHANICAL COUNTER

[75] Inventor: Hans Neher, Hausen am Tann, Fed. Rep. of Germany

[73] Assignee: J. Hengstler K.G., Aldingen, Fed. Rep. of Germany

[21] Appl. No.: 49,443

[22] Filed: Jun. 18, 1979

[30] Foreign Application Priority Data

Jun. 30, 1978 [DE] Fed. Rep. of Germany ....... 2828907

[51] Int. Cl.³ .................... G06C 27/00; G06F 15/18
[52] U.S. Cl. .................................. 235/109; 235/132 E
[58] Field of Search .......... 235/132 A, 132 E, 132 R, 235/144 B, 144 E, 144 R, 144 DM, 144 SP, 114, 144 HC, 134, 109

[56] References Cited

U.S. PATENT DOCUMENTS

| 2,808,208 | 10/1957 | Wales .............................. 235/132 R |
| 3,343,789 | 9/1967 | Wales, Jr. et al. ................. 235/132 R |
| 3,451,620 | 6/1969 | Vogel et al. ...................... 235/132 R |
| 3,531,047 | 9/1970 | Pfeiffer ........................... 235/14 HC |
| 3,620,447 | 11/1971 | Szeluga et al. ................... 235/132 R |
| 3,711,016 | 1/1973 | Milvich ............................ 235/132 E |

Primary Examiner—L. T. Hix
Assistant Examiner—Benjamin R. Fuller

Attorney, Agent, or Firm—Balogh, Osann, Kramer, Dvorak, Genova & Traub

[57] ABSTRACT

A plurality of presettable digit wheels are rotatably mounted on a first axis. Each of said wheels is rotatable to a plurality of preset positions corresponding to respective values of an associated digit position of a preselected count. Retaining means retain said presettable wheels in said preset positions during a counting operation of the counter. A signal generator comprises axially movable cam follower means arranged to generate a signal when said counter has counted to said preselected count. A plurality of presetting members are associated with respective ones of said presettable wheels and pivoted to a stationary first pivot. At portions remote from said first pivot, said presetting members are engaged by a guide member, which is pivotally movable between first and second positions to move said presetting members about said pivot out of and into engagement with said presettable wheels. First spring means are adapted to urge said guide member to said first position. The presetting members are displaceable relative to said pivot and said guide member to rotate said presettable wheels when said presetting members are in engagement with said presettable wheels.

14 Claims, 5 Drawing Figures

MECHANICAL COUNTER

BACKGROUND OF THE INVENTION

This invention relates to a presetting mechanism for mechanical counters, preferably counting-up counters, in which the preset count is stored and which comprise a signal generator having axially acting cam followers.

Such presetting mechanisms are known for mechanical counters in which the preset count is stored and in which in response to a counting to the preset count the cam followers perform cumulative axial operations whereby a signal-generating contact is closed. In this arrangement, a high torque is required when the preset count is reached so that the mechanical counter requires strong drive means, which are not required for the actual counting operation.

Presettable counters have also the disadvantage that the counter must be set to zero before it can be preset.

It is an object of the invention to eliminate the above-mentioned disadvantages and to provide for a presettable mechanical counter a presetting mechanism for presetting the counter to a count which is always visible.

The presetting mechanism for a mechanical counter, preferably a counting-up counter, in which the preset count is stored and which comprises a signal generator having axially acting cam followers is characterized according to the invention in that presetting members are provided, which are pivoted on a fixed pivot and at a distance from the pivot are engaged by a rakelike guide member, which is pivotally movable to move said presetting member into engagement with the presettable digit wheels and spring-biased to an initial position, in which said presetting members are disengaged from said wheels. The guide member has teeth, which in an initial position of said member engage teeth of said wheels to hold them in position, and is integrally formed with a spring lug, which is slidable along the housing and urges the key-guiding member to its initial position. Owing to the use of multifunctional parts, this arrangement can be made at low cost while ensuring a high reliably of function and ease of operation.

Figure 2:
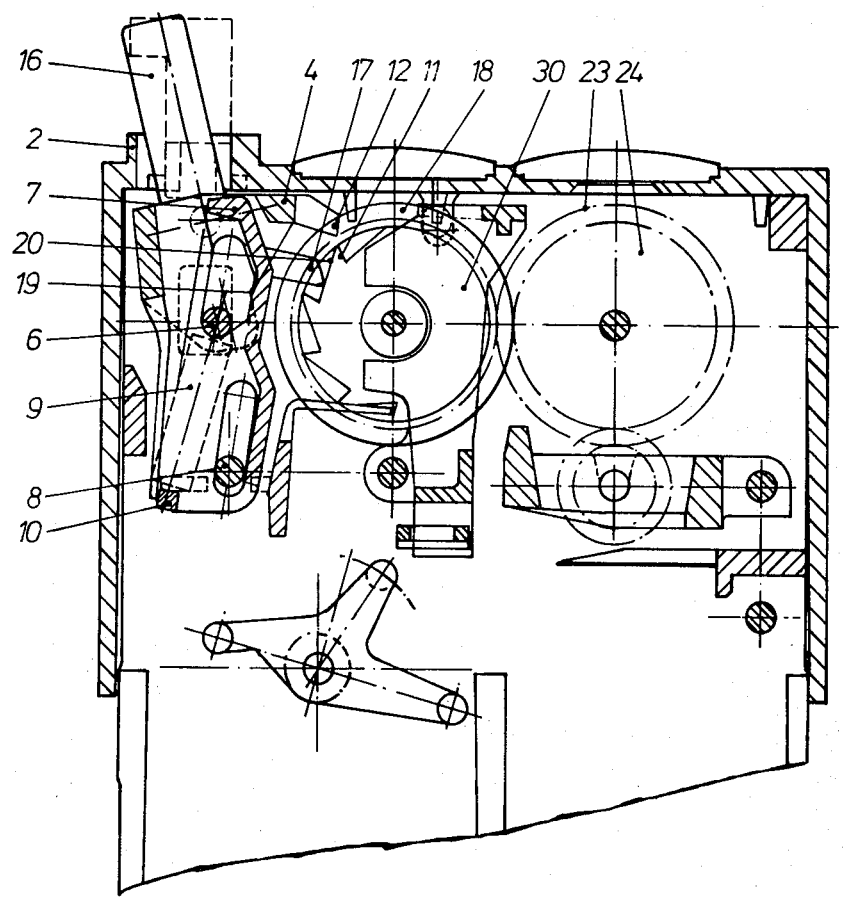
Figure 3:
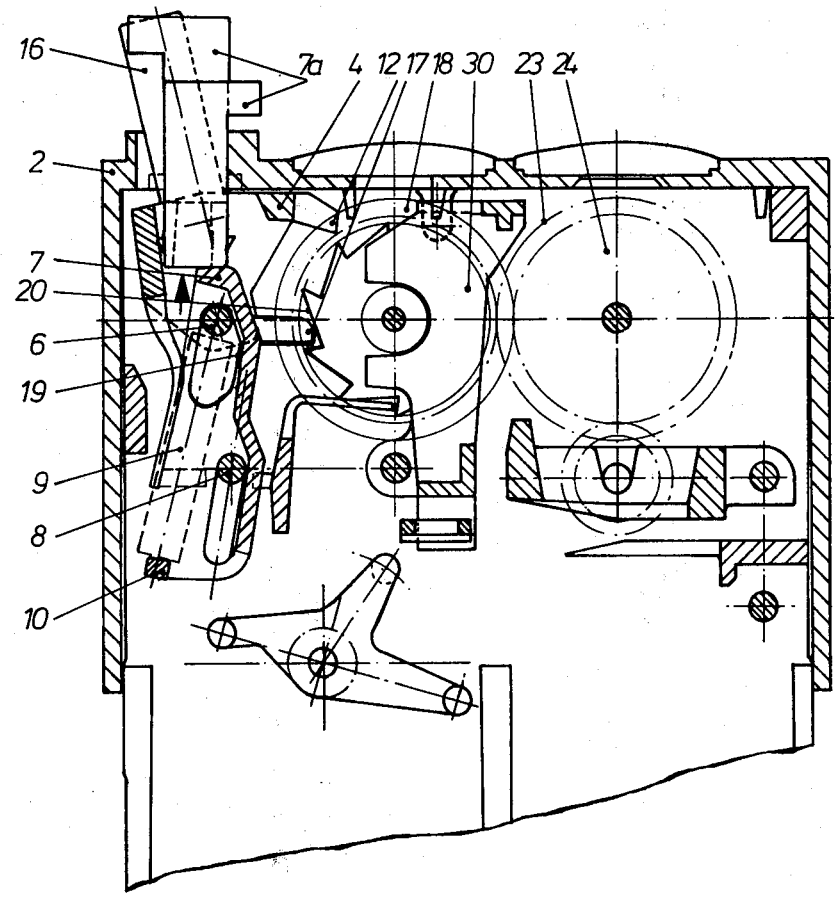
Figure 4:
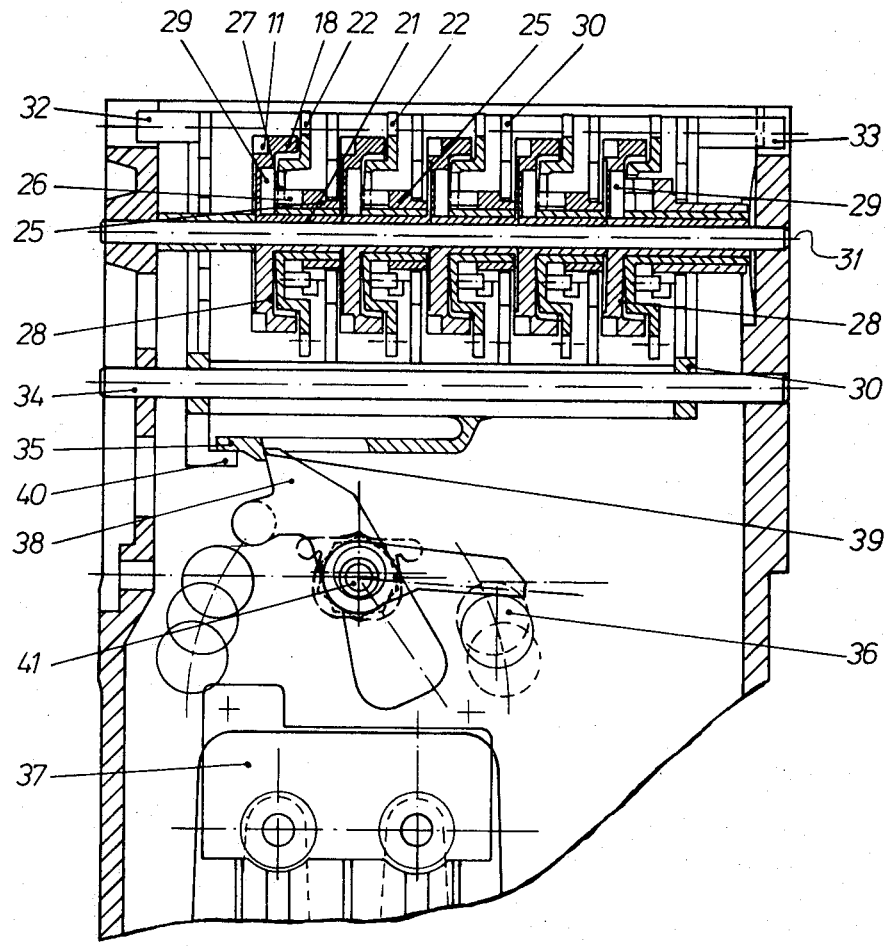
Figure 5:
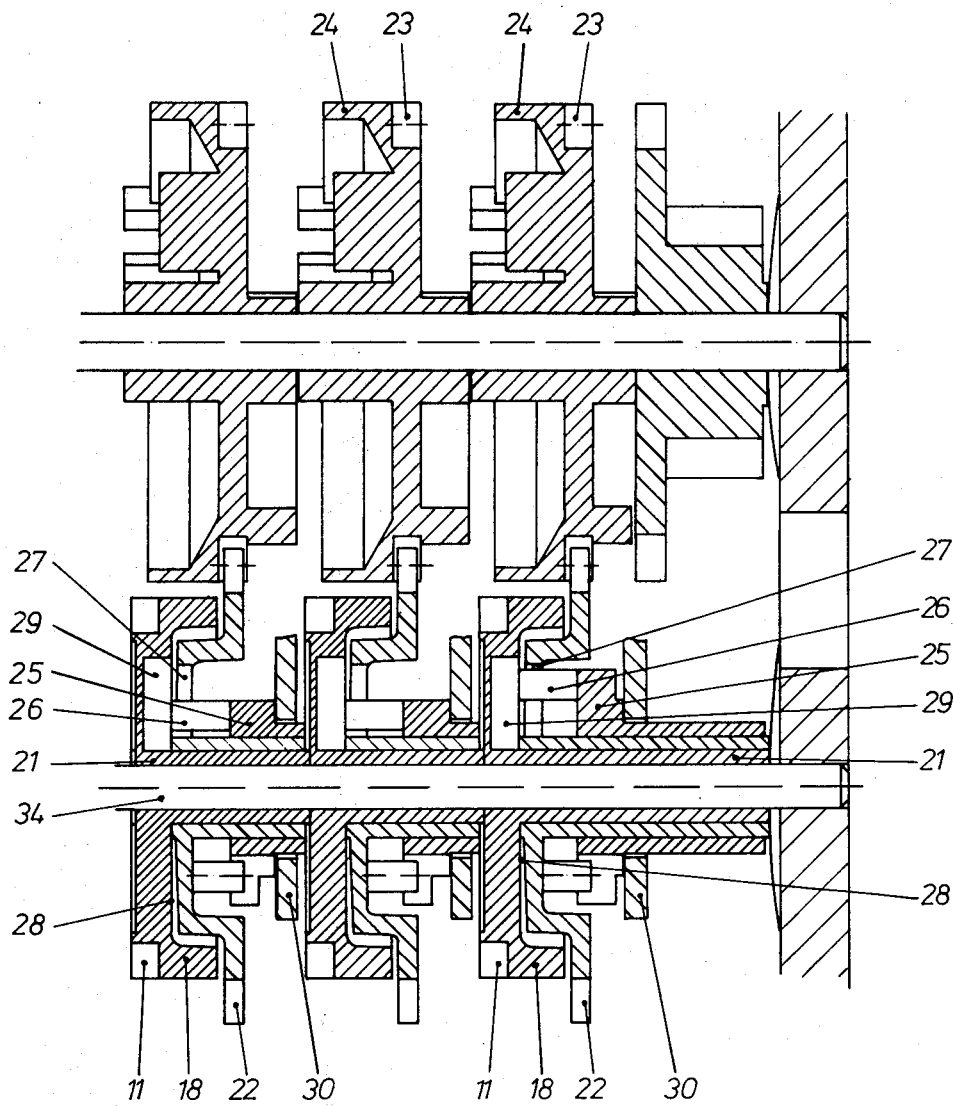

A presetting mechanism for mechanical counters which embodies the invention is shown diagrammatically and by way of example on the drawings, in which FIG. 1 is a transverse sectional view showing the presetting mechanism in position of rest, FIG. 2 is a transverse sectional view showing the presetting mechanism in the position in which it is ready for presetting, FIG. 3 is a transverse sectional view showing the presetting member which is ready for presetting, with the presetting key depressed, and FIGS. 4 and 5 are longitudinal sectional views showing the mechanism with the signal generator.

In FIG. 1 of the drawing, the presetting mechanism is shown as well as its arrangement in the frame 1, which is provided with a cover 2. The latter has windows provided with magnifiers 3 for reading the count. It is also apparent that the guide member 4 is provided, which is pivoted in the frame 1 and snapped in a bearing bore 5. The guide member 4 carries a guide pin 6, which is axially parallel to the bearing hole 5 and on which presetting members 7 are guided. The presetting members 7 are also guided on a pivot 8, which is spaced from the guide pin 6 and fixed in the frame 1. A tension spring 9 urges the presetting members to the basic position shown in FIG. 1.

The tension spring 9 is connected at one end to the guide pin 6 and at the other end to a bracket 10, which is spaced from the pivot 8. As a result, the spring 9 can urge the presetting members 7 toward their position of rest as well as toward the teeth 11 of the presettable wheels 18. The guide member 4 is provided with retaining fingers 12, which are arranged like the tines of a rake and when the mechanism is in position of rest engage the teeth 11 to align the guide member 4 and to lock the presettable wheels 18. A leaf spring 13 is provided, which bears on an abutment 14 and urges the guide member 4 toward its position of rest, shown in FIG. 1. Rakelike detent springs 15 are integrally formed with the frame 1 and engage the teeth 11 while permitting the wheels 18 to be rotated in the presetting sense.

As is shown in FIG. 2, the guide member 4 comprises an actuating lever 16, which extends out through the cover 2 and serves to pivotally move the guide member 4 by hand to a position for presetting. By means of the actuating lever 16, the retaining fingers 12 can be pivotally moved away from the teeth 11. At the same time, the pivotal movement of the guide pin 6 causes the teeth 17 of the presetting keys 7a to engage the teeth 11 of the presettable wheels 18.

It is apparent from FIG. 3 that the presetting members 7 can be actuated so that their teeth engage the teeth 11 of the presettable wheels 18 to rotate the latter toward the count to which the counter is to be preset. When the member 7 is depressed, the tension spring 9 is stressed so that it can return the member 7 to its initial position when the member 7 has been released. During this operation, the member 7 slides up on the side face 20 of the teeth 11, owing to the widened guide slot 19, formed in the member 7 and receiving the guide pin 6, and is pivotally moved by the tension spring 9 about the pivot 8 while skipping the teeth 11.

It is apparent particularly from FIG. 3 that each presetting member 7 is manually operable by a presetting key 7a, which is guided in the cover 2. Each presetting member 7 is constrained to follow the pivotal movement of the guide member 4 to a position in which the member 7 engages the teeth 11 or is clear therefrom.

Particularly in an arrangement in which the presettable wheels are held in their preset position during the counting operation, the presetting mechanism is combined with an axially actuated signal generator, which is shown more in detail in FIGS. 4 and 5. FIG. 5 is a fragmentary view showing a portion of FIG. 4 on a larger scale. Each presettable wheel which is provided with teeth 11, has associated with it a signalling gear 22, which is mounted on the hub 21 of the presettable wheel, and is driven by an associated indicating wheel 24, which has a gear 23, shown in FIGS. 1 to 3, in mesh with the associated gear 22.

The signalling gear 22 has a hub, on which a cam follower ring 25 provided with projection 26 is axially slidably mounted. Each projection 26 extends through an aperture 27 of the associated signalling gear 22 into engagement with the end face 28 of the associated presettable wheel 18. By means of the projection 26 and the aperture 27, the cam follower ring 25 is non-rotatably coupled to the associated signalling gear 22. When the projection 26 is in registry with a signalling recess formed in the end face 28, the projection 26 falls into said recess and the cam follower ring 25 performs a signalling stroke. The signalling strokes of all cam follower rings 25 are actuated by the signalling rake 30, which bears on all cam follower rings 25 and is axially biased by a switch 37, which has been prestressed and click-stopped.

The signalling rake 30 embraces the cam follower rings 25 at their hub portions and is axially slidably mounted on guide pins 32 and 33 above the axle 31 on which the presettable wheels are rotatably mounted and on a guide rod 34 below said axle. The guide rod 34 is fixed in the frame 1. The signalling rake 30 carries an inherently resilient detent 35. A switch 37 has an actuating lever 36, which through the intermediary of a bell-crank lever 38 bears on said detent pawl 35.

When the counter has counted to a preselected count which corresponds to the positions of the presettable wheels, the signalling rake 30 is displaced to such an extent that the bell-crank lever 38 disengages the surface 39, at which it previously engaged the detent 35. As a result, the actuating lever 36 is tripped to generate a signal. When the counter is in zero position, the bell-crank lever 38 can be returned. In that operation, the resilient detent 35 yields and then holds the bell-crank level 38 in position when the switch has been prestressed. To permit of an exact adjustment of the release position, the detent 35 bears under initial stress on a stop angle 40, which is integrally formed on the signalling rake 30. An adjustment of the release point is made possible because the pivot 41 for the bell-crank lever consists of a rotatable eccentric, which is connected to a ratchet.

The present embodiment is mainly designed for the use of multi-functional components so that a maximum number of functions can be obtained with a minimum number of parts.

What is claimed is:

1. In a mechanical counter comprising a plurality of presettable digit wheels, each of which is rotatable on a first axis to a plurality of preset positions corresponding to respective values of an associated digit position of a preselected count, retaining means for retaining said presettable wheels in said preset positions during a counting operation of the counter, and a signal generator comprising axially movable cam follower means arranged to generate a signal when said counter has counted to said preselected count, the improvement which comprises
    a plurality of presetting members, which are associated with respective ones of said presettable wheels,
    a stationary pivot on which said presetting members are pivoted,
    a guide member which engages said presetting members at portions thereof which are remote from said pivot and which is pivotally movable between first and second positions to move said presetting members about said pivot out of and into engagement with said presettable wheels,
    first spring means adapted to urge said guide member to said first position,
    said presetting members being displaceable relative to said pivot and said guide member to rotate said presettable wheels when said presetting members are in engagement with said presettable wheels,
    a plurality of indicating wheels are rotatably mounted on a second axis, which is parallel to and spaced from the first, and are associated with respective digit positions and rotatable to a plurality of count-indicating positions,
    each of said presettable wheels having on one side a hub and an end face formed with a cam recess,
    a set of first gears are arranged to rotate on said second axis in unison with respective ones of said indicating wheels, and
    said signal generator comprises a set of second gears, which are associated with respective ones of said presettable wheels and rotatably mounted on the hubs thereof and in mesh with respective ones of said first gears, each of said second gears having a hub, which axially protrudes on the same side as the hub of the associated presettable wheel.

2. A mechanical counter as set forth in claim 1, which constitutes a counting-up counter.

3. A mechanical counter as set forth in claim 1, in which
    said presettable wheels comprise teeth which are engageable by said presetting members and
    said retaining means comprise fingers carried by said guide member and arranged to engage said teeth when said guide member is in said first position.

4. A mechanical counter as set forth in claim 1, in which
    said presettable wheels, retaining means, signal generator, presetting members, and guide member are accommodated in a housing,
    said pivot is fixed in said housing B and
    said first spring means comprise a spring lug, which is integrally formed with said guide member and in slidable contact with said housing.

5. A mechanical counter as set forth in claim 1, in which
    said presettable wheels, retaining means, signal generator, presetting members, and guide member are accommodated in a housing,
    said pivot is fixed in said housing,
    said housing has axially aligned apertures and
    said guide member is integrally formed with axially aligned pivot pins pivoted in said apertures.

6. In a mechanical counter comprising a plurality of presettable digit wheels, each of which is rotatable on a first axis to a plurality of preset positions corresponding to respective values of an associated digit position of a preselected count, retaining means for retaining said presettable wheels in said preset positions during a counting operation of the counter, and a signal generator comprising axially movable cam follower means arranged to generate a signal when said counter has counted to said preselected count, the improvement which comprises
    a plurality of presetting members, which are associated with respective ones of said presettable wheels,
    a stationary pivot on which said presetting members are pivoted,
    a guide member which engages said presetting members at portions thereof which are remote from said pivot and which is pivotally movable between first and second positions to move said presetting members about said pivot out of and into engagement with said presettable wheels,
    first spring means adapted to urge said guide member to said first position,
    said presetting members being displaceable relative to said pivot and said guide member to rotate said presettable wheels when said presetting members are in engagement with said presettable wheels, a plurality of indicating wheels are rotatably mounted on a second axis, which is parallel to and spaced from the first, and are associated with respective digit positions and rotatable to a plurality of count-indicating positions, each of said presettable wheels has on one side a hub and an end face formed with a cam recess, a set of first gears are arranged to rotate on said second axis in unison with respective ones of said indicating wheels, and said signal generator comprises a set of second gears, which are associated with respective ones of said presettable wheels and rotatably mounted on the hubs thereof and in mesh with respective ones of said first gears, each of said second gears having a hub, which axially protrudes on the same side as the hub of the associated presettable wheel, and a set of cam follower rings, which are mounted on the hubs of and non-rotatably coupled to respective ones of said second gears and axially slidable relative thereto, each of said cam follower rings having a projection, which protrudes through the associated second gear and engages said end face of the associated presettable wheel and is adapted to fall into said cam recess of said end face when the associated indicating wheel has rotated to a count-indicating position which corresponds to the preset position of the associated presettable wheel.

7. A mechanical counter as set forth in claim 6, in which said cam follower rings are non-rotatably coupled to the associated second gears by said projections.

8. A mechanical counter as set forth in claim 6, in which each of said cam follower rings comprises a hub and said signal generator comprises a signalling rake, which is movable in the direction of said axes and has a plurality of tines, which embrace the hubs of respective ones of said cam follower rings, and second spring means urging said signalling rake in the direction in which said projections protrude from said cam follower rings.

9. A mechanical counter as set forth in claim 8, in which said signalling rake is guided along said first axis on opposite sides thereof.

10. A mechanical counter as set forth in claim 9, in which said first axis is horizontal, said signalling rake is guided above said first axis by means of lateral projections which are integral with said rake and said signalling rake is guided below said first axis by means of a guide rod, which extends through said rake.

11. A mechanical counter as set forth in claim 8, in which said rake is integrally formed with a stop, which protrudes on the side opposite to said tines and said rake is also integrally formed with a detent spring, which protrudes on the side opposite to said tines and is inherently biased away from said tines and engages said stop.

12. A mechanical counter as set forth in claim 11, in which said detent spring has an engaging surface facing in the same direction as said end faces, and said signal generator comprises a bell-crank level, which is engageable with said engaging surface, and a microswitch having an actuating lever which is engaged and biased by said second spring means and is operatively connected to said actuating lever and movable against its spring bias to move said bell-crank lever into engagement with said engaging surface, said bell-crank lever being arranged to clear said engaging surface when and only when all said projections have entered the associated cam recesses.

13. A mechanical counter as set forth in claim 12, in which said actuating lever is movable to prestress said second spring means and to engage said bell-crank lever with said engaging surface.

14. A mechanical counter as set forth in claim 12, in which said bell-crank lever is rotatably mounted on en eccentric, which is carried by a rotatably mounted shaft, which is provided at least on one side of said bell-crank lever with a ratchet.

* * * * *